(12) United States Patent
Akkar et al.

(10) Patent No.: US 8,612,761 B2
(45) Date of Patent: Dec. 17, 2013

(54) METHOD OF EXECUTING A CRYPTOGRAPHIC PROTOCOL BETWEEN TWO ELECTRONIC ENTITIES

(75) Inventors: Mehdi-Laurent Akkar, Gentilly (FR); Paul Dischamp, Paris (FR)

(73) Assignee: Oberthur Card Systems SA, Paris (FR)

( * ) Notice: Subject to any disclaimer, the term of this patent is extended or adjusted under 35 U.S.C. 154(b) by 1255 days.

(21) Appl. No.: 09/771,967

(22) Filed: Jan. 30, 2001

(65) Prior Publication Data

US 2001/0012360 A1  Aug. 9, 2001

(30) Foreign Application Priority Data

Jan. 31, 2000 (FR) ...................................... 00 01199

(51) Int. Cl.
*H04L 9/32* (2006.01)
*H04L 9/00* (2006.01)
*G06F 12/14* (2006.01)

(52) U.S. Cl.
USPC ................. 713/170; 380/29; 380/1; 713/194; 726/34

(58) Field of Classification Search
USPC ............... 726/34; 380/29, 28, 30, 1; 713/189, 713/194, 168, 170
See application file for complete search history.

(56) References Cited

U.S. PATENT DOCUMENTS

| | | | |
|---|---|---|---|
| 5,870,468 A * | 2/1999 | Harrison | 713/165 |
| 5,933,501 A * | 8/1999 | Leppek | 380/259 |
| 6,278,783 B1 * | 8/2001 | Kocher et al. | 380/277 |
| 6,301,362 B1 * | 10/2001 | Matyas et al. | 380/37 |
| 6,510,518 B1 * | 1/2003 | Jaffe et al. | 713/168 |
| 6,594,761 B1 * | 7/2003 | Chow et al. | 713/190 |
| 6,658,569 B1 * | 12/2003 | Patarin et al. | 713/194 |
| 6,725,374 B1 * | 4/2004 | Jahnich et al. | 713/190 |
| 2003/0118190 A1 | 6/2003 | Sedlak et al. | |

FOREIGN PATENT DOCUMENTS

| | | |
|---|---|---|
| EP | 0566811 | 10/1993 |
| JP | 04-157837 | 5/1992 |
| NL | 1011800 | 11/1999 |
| WO | WO 99/53419 | 12/1999 |
| WO | WO 99/63696 | 12/1999 |

OTHER PUBLICATIONS

Schneier, Bruce. Applied Cryptography, 2nd Edition: Protocols, Algorithms, and Source Code in C. John Wiley & Sons, Inc., 1996. pp. 265-301.*

Messerges, Thomas et al. "Investigations of Power Analysis Attacks on Smartcards." USENIX Workshop on Smartcard Technology. The USENIX Association, 1999.*

* cited by examiner

*Primary Examiner* — Zachary A Davis
(74) *Attorney, Agent, or Firm* — Browdy and Neimark, PLLC

(57) ABSTRACT

Perfected cryptographic protocol making it possible to counter attacks based on the analysis of the current consumption during the execution of a DES or similar.

According to the invention, a message (M) is processed by two entities (A and B) and the entity (B) subject to attack executes a chain of operations known as DES in which it is chosen to carry out a given operation $(O_1, O_2, O_3 \ldots O_n)$ or the same operation complemented $(\overline{O}_1, \overline{O}_2, \overline{O}_3 \ldots \overline{O}_n)$, the choice being random.

17 Claims, 2 Drawing Sheets

METHOD OF EXECUTING A CRYPTOGRAPHIC PROTOCOL BETWEEN TWO ELECTRONIC ENTITIES

FIELD

The invention relates to a method of executing a cryptographic protocol between two electronic entities, one of them being, for example but not exclusively, a smart card. The invention relates more particularly to a perfecting of the said protocol to prevent "attacks", that is to say fraud attempts based on the analysis of the equipment whilst operating, in particular by means of measurements of the current consumption during the execution of such a cryptographic protocol initiated by a defrauder.

BACKGROUND

It is known that certain encrypted electronic entities, in particular microcircuit cards, are vulnerable to attacks based on the analysis of certain parameters during an operational phase. It is said that information can "leak" from a calculation made in the card, typically the execution of a cryptographic protocol initiated by the defrauder in possession of the card. The parameters analysed during the execution of such a protocol can be, typically, differences in computing time or electromagnetic radiations during the execution of the computation but, above all, the current consumption by the electronic entity for which an attempt is being made to break the code.

Thus, the conventional attack consists in causing the electronic entity which has fallen into the hands of the defrauder to execute a certain number of cryptographic protocols based on random messages, and therefore destined for failure, but having the consequence of having executed each time by the entity (the microcircuit card) a chain of operations known by the abbreviation DES (Data Encryption Standard) whilst analysing the current consumption during each execution of the said DES. The purpose of this attack is to discover the secret code of the said entity. As regards the DES, this is a well known algorithm, very widely used at present in the field of bank cards or that of access control cards.

By way of example, in the framework of a normal authentication between an entity A, for example a server, and an entity B, for example a microcircuit card in which the DES is programmed, the exchanges of information between the two entities are as follows:

the server A requests the card B to send a message, A and B being assumed to be in possession of the same key.

B sends any message and retains it in memory.

A applies the DES to the message using its key and returns the result to the card B.

At the same time, the card B applies the DES to the message which it has sent to the server A by making use of its own key. It obtains a result which is compared with that generated by the server A. If the two results are identical, the authentication is validated.

Furthermore, in the case of a fraud, that is to say in the case where the defrauder has the card and is seeking to determine the key, the defrauder can connect the card to a reader with which he will be able to transmit messages to it and connect it to means of recording the current consumption during the execution of the operations which it carries out.

On the basis of these simple means, the defrauder forms a system F which he connects to the card in place of the server A.

The process is then as follows. F requests a message from the card exactly as in the case of initialising an authentication. B sends this message. F sends another message to B presumed to be the result of treatment by the DES of the message sent by B. This message is of course incorrect. However, B makes use of its own key to execute a DES in order to obtain a result for the purpose of comparing it with the (incorrect) message sent by F. The result of this comparison is inevitably negative but the defrauder has succeeded in initiating the execution of a DES by B. During the execution of the said DES, the current consumption is detected and stored.

If F is capable of having a certain number of DES carried out by the card B, under the same conditions, and of storing the current consumption each time, it is possible to implement an attack whose principle is known. This attack, called "DPA" (Differential Power Analysis) makes it possible to reconstitute the secret key of the entity B.

The document WO 99/63696 aims at countering attacks of this type by reducing the exploitable information capable of "leaking" during the execution of algorithms. In order to do this it suggests, in particular, introducing hazards in the cryptographic protocols in order to increase the number of cycles necessary in order to discover the secret key.

SUMMARY

The invention proposes a precise parry to an attack of the "DPA" type by the random complementing of certain operations of the DES.

The invention applies more particularly to entities using the DES but it is also applicable, as will be seen below, to other entities (microcircuit cards) using algorithms other than the DES provided that the latter consists a succession of operations having certain properties which shall be explained later.

More precisely, the invention relates to a method of generating a cryptographic protocol between a first electronic entity and a second electronic entity subject to attack, according to which any message is generated, on the basis of which a chain of operations is carried by the said second entity resulting in the generation of a resultant or response message, the said response being compared with the result of another similar processing applied to the said message and carried out by the said first entity, characterised in that, at least in certain stages of the said chain of operations, the said second entity carries out either an operation of a chosen type or the same operation complemented, the choice depending on a random decision and in that the said response is constituted by the result of the last operation of the said chain, possibly complemented.

The complementing can be carried out either byte by byte, by doing the exclusive OR of the current byte randomly with one of the two hexadecimal values 00 and FF, or bit by bit, by processing the eight consecutive bits of the current byte together and doing the exclusive OR with a number chosen randomly, at each processed bit, from among the 256 hexadecimal value from 00 to FF.

Among the operations capable of being complemented may be quoted the operation called the exclusive OR or an operation of permutation of the bits of he message or of an intermediate result obtained whilst carrying out the said chain of operations, that is to say, according to the described example, after execution of a given operation of the DES. It is also possible to mention the operation of indexed access to a table or any operation which is stable in comparison with the application of the exclusive OR function, in particular the operation consisting in transferring the message or a previously mentioned intermediate result, from one location to another, of a storage space.

According to one possible embodiment, there is defined in the said second entity two chains of operations for the processing of the said message, one of the chains consisting of a series of data operations and the other chain consisting of a series of the same operations complemented and a final complementing and it is decided randomly to execute one of the two chains of operations on each reception of a message coming from the said first entity.

According to another embodiment, for the time being considered preferable, the method consists in using the said message or an intermediate result resulting from the execution of a preceding operation of the said chain, in applying a new operation of the said chain to it, or this same operation complemented, depending on the state of a random parameter associated with this new operation, in updating a complementing counter and in taking into account the state of this counter at the end of the execution of the said chain of operations in order to decide on the final configuration of the said response.

According to yet another advantageous variant, the method consists in using the said message, or an intermediate result of the execution of a preceding operation of the said chain, in applying to it a new operation of the said chain or this same operation complemented, depending on the state of a random parameter associated with this new operation and in transmitting, from operation to operation, information forming part of the said intermediate results, necessary for the final configuration of the said response.

Furthermore, it has been found that the difference between the number of times when the operations are carried out in a normal fashion and the number of times when they are carried out with complementing, during the execution of the DES or similar, must not be too great in order that the method may retain all of its efficiency with respect to the above-described attack. Consequently, the method is also noteworthy in that, whilst the said series of operations is being carried out, there is computed the difference between the number of times when the operations have been carried out in a normal fashion and the number of times when they have been carried out with complementing and in that the hazard is deleted on the decision to carry out operations in a normal or complemented manner, for a certain number of subsequent operations, when the said difference exceeds a predetermined value, in view of reducing the said difference.

BRIEF DESCRIPTION OF THE DRAWINGS

The invention will be better understood and other of its advantages will appear more clearly in the light of the following description of a method of executing a cryptographic protocol according to its principle, given solely by way of example and referring to the appended drawings in which.

DETAILED DESCRIPTION

Figure 1:
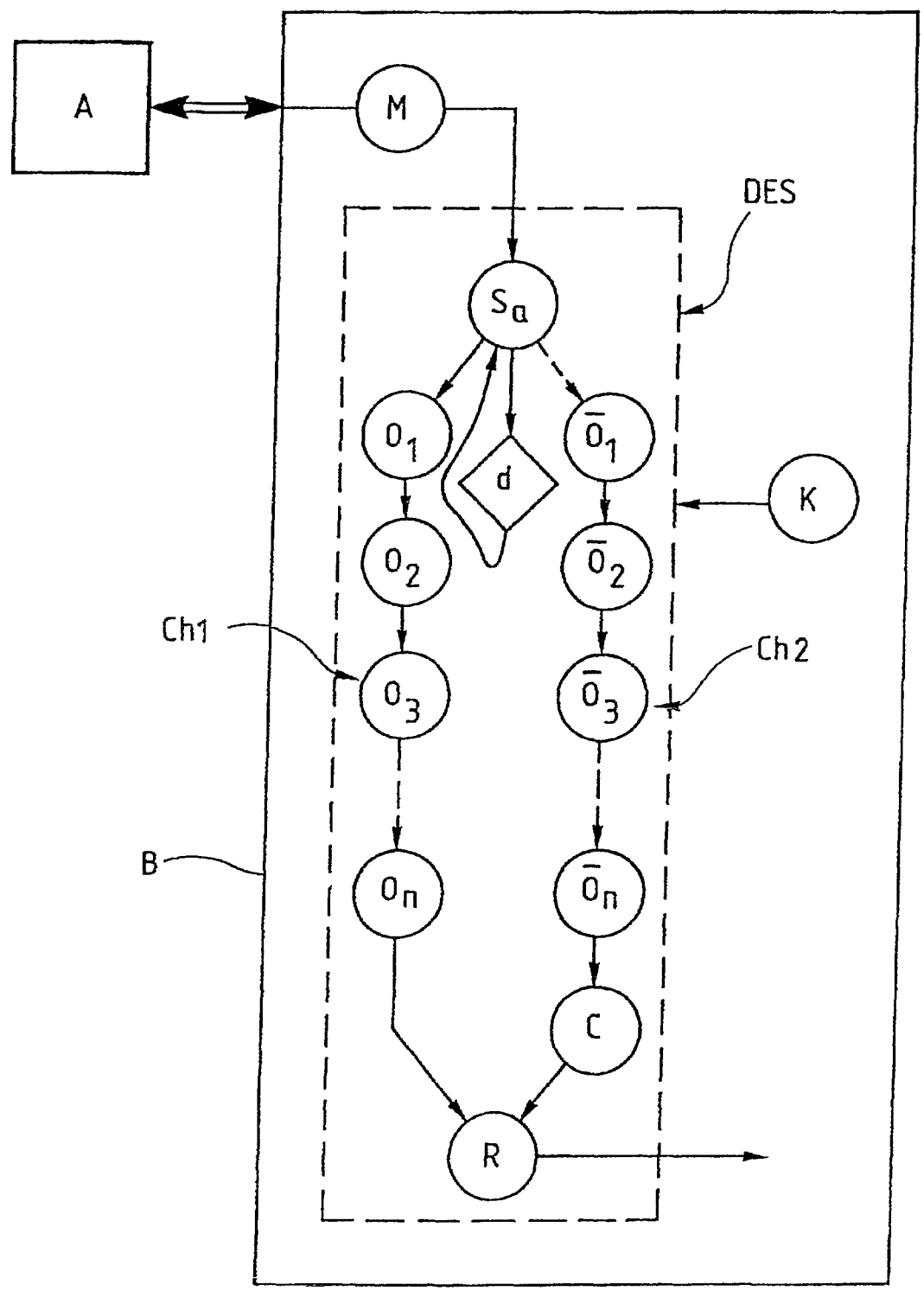
FIG. 1 is a diagram illustrating a part of the execution of cryptographic protocol, more precisely the execution of a DES programmed according to the invention.

Considering FIG. 1 more particularly, it is noted that the method of generating a cryptographic protocol between two electronic entities A and B, which is partially illustrated in the diagram, can be executed in one of these entities, typically in a smart card B when the latter is connected, for example, to a server A. The DES according to the invention is programmed in the smart card B. The latter also contains in its memory a secret key K which is capable of intervening in certain of the operations $O_1, O_2, O_3 \ldots O_n$ which concatenate during the execution of the DES. During the generation of the cryptographic protocol, the first entity (typically the said server A) requests the second entity (the card B) to send a message M. The message generated by B is any message: it is retained in memory in the card B. Whilst A processes this message with its own DES the card B applies the DES according to the invention to the message M which it has sent to the server A, making use of its own key K. In the example, the DES applied to the card B comprises two chains of operation. A first chain $Ch_1$ of operations $O_1, O_2, O_3 \ldots O_n$ corresponds to a conventional DES. The second chain $Ch_2$ of operations $\overline{O}_1, \overline{O}_2, \overline{O}_3 \ldots \overline{O}_n$ consists of the same succession of the same operations, but complemented. It is completed by a global complementing C of the result generated at the end of the last complemented operation $\overline{O}_n$.

Furthermore, it is decided in a random manner to execute one or other of the two chains of operations at each generation of a said any message. This random choice is symbolised by a selector $S_a$, interposed between the message M and each of the two chains of operations. The positioning of the selector is random, which means that each time a message M must be processed, one other of the two chains of operation $Ch_1$, $Ch_2$ is chosen in a random manner.

If the non-complemented chain has been chosen, the result given by the last operation $O_n$ constitutes the response R which will be compared with the one which will have been generated by the server A. In the case where the chain of complemented operations has been selected, the result of the last operation $\overline{O}_n$ is complemented and constitutes the response R.

Figure 2:
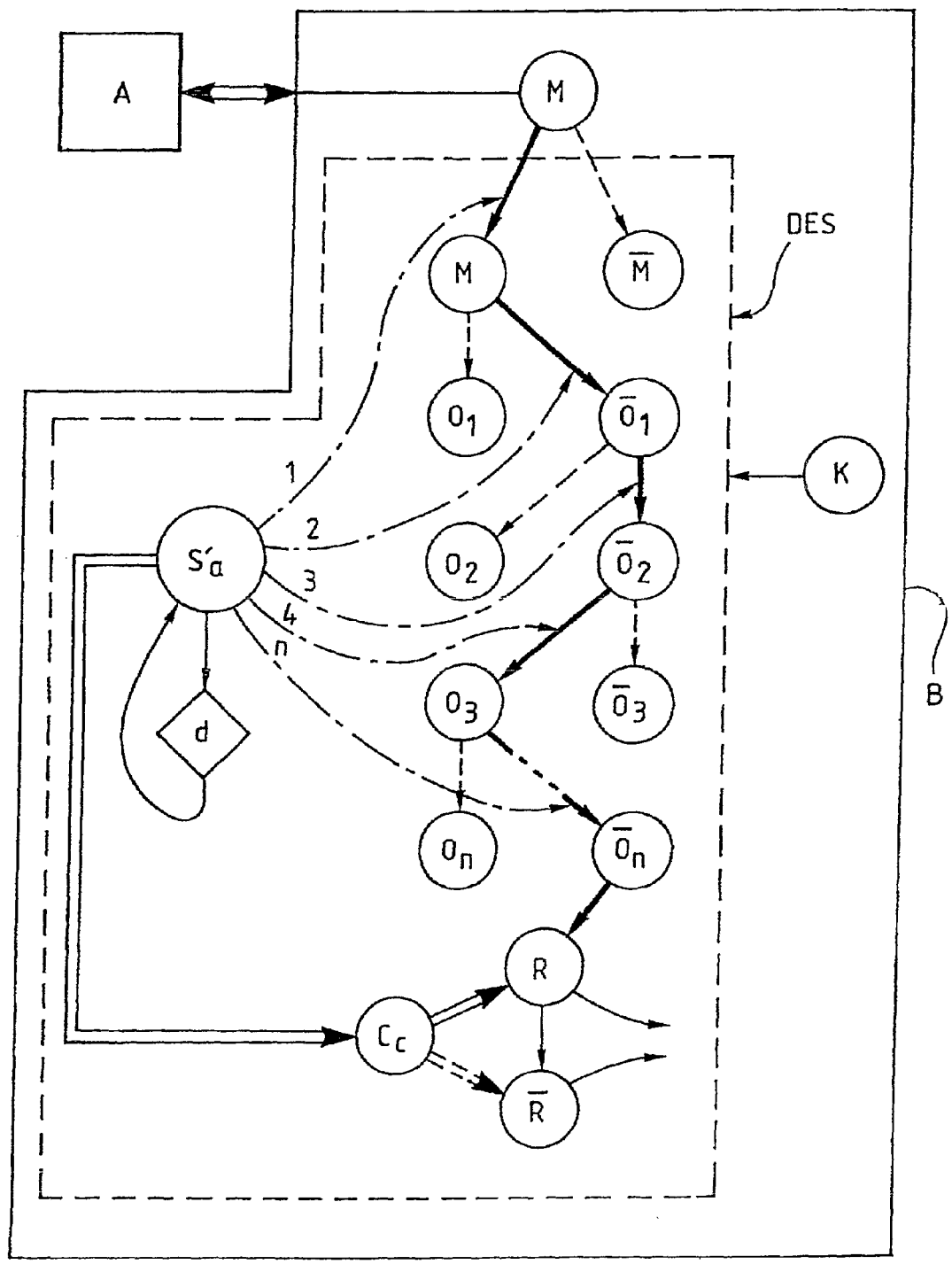
FIG. 2 is a diagram illustrating another way of executing the DES according to the invention.

In the embodiment shown in FIG. 2, a DES programmed according to the principle of the invention appears again, that is to say comprising the usual operations of a DES: $O_1, O_2, O_3 \ldots O_n$ or the similar complemented operations $\overline{O}_1, \overline{O}_2, \overline{O}_3 \ldots O_n$. The message itself can be complemented, that is to say used as it is at the start of the execution of the DES or in complemented form $\overline{M}$. The key K is used for the execution of at least certain operations. However, the selection of the operations, (that is to say the choice between the normal operation and its complemented version) is decided randomly from one operation to the next. In other words, the message M or an intermediate result resulting from the execution of a preceding operation $O_i$, (or $\overline{O}_i$) is used, a new operation of the chain or its complemented version (that is to say $O_{i+1}$ or $\overline{O_{i+1}}$) is applied to it depending on the state of a random parameter associated with the new operation. This random parameter is generated by the selector $S'_a$. Thus, by following the path of FIG. 2, it can been seen that it is the message M, as it is, which is used and not its complement $\overline{M}$ (command 1 generated by $S'_a$) that it is the operation $\overline{O}_1$ which is selected (command 2) then the operation $\overline{O}_2$ (command 3), then the operation $O_3$ (command 4) and finally the sequence ends with the selection of the operation $\overline{O}_n$ (command n). The result of the last operation, $\overline{O}_n$ on this occasion, can constitute the result R or the complemented result $\overline{R}$ which will be compared with another result generated by the entity A by using its own DES. The choice between R and $\overline{R}$ is given by the state of a complementing counter $C_c$ fed throughout the generation of the process by the selector $S'_a$. In other words, the state of the complementing counter $C_c$ makes it possible to know if it is necessary to validate the result R or its complement $\overline{R}$ for the final configuration of the response to be compared with the computations of the entity A.

It should be noted that a variant makes it possible to eliminate the counter $C_c$. It suffices to transmit, from operation to operation, information forming part of the intermediate results and representing the number of times when a DES operation has been executed in complemented form. In this case, the intermediate results transmitted from one operation to another themselves comprise the information equivalent to that finally given by the counter $C_c$ in the embodiment shown in FIG. 2. In this case, the last intermediate result given by the execution of the operation $O_n$ or $\overline{O}_n$ is or is not complemented depending on a part of its own information which it contains. The final configuration of the response R is derived from it.

Returning to FIG. 1 or 2, it is noted that the selector $S_a$ or $S'_a$ is used for computing the difference between the number of times that the operations have been carried out in normal manner and the number of times they have been carried out with complementing. This difference d is stored and updated from operation to operation.

When the difference exceeds a predetermined value, which can reduce the efficiency of the method against the DPA attack, an order is generated which momentarily inhibits the selector $S'_a$. In other words, the hazard is eliminated from the decision to carry out operations in the normal or complemented way, in order to execute a certain number of subsequent operations in the mode (normal or complemented) least used up to that point. The hazard is put back into use when the value of the difference d has been sufficiently reduced.

It is found that all of the operations of a conventional DES allow the implementation of the method according to one or other of the variants which have just been described.

By way of example, there will be mentioned below certain operations capable of being complemented and consequently compatible with the implementation of the method which has just been described.

An operation capable of being complemented is the operation known as the exclusive OR.

Another operation capable of being complemented is a known operation of permutation of the bits of the message M or of an intermediate result obtained on carrying out the chain of operations. For the permutations (simple, compressive or expansive), the permuted mask will advantageously be stored in memory.

Another operation capable of being complemented is the operation known as indexed access to a table.

Another operation capable of being complemented is the transfer of the message or of an intermediate result obtained whilst carrying out an operation of the chain, from one location to another of a storage space defined in the entity B. In practice, a mask is applied in a random manner by exclusive OR to the transferred data.

More generally, an operation capable of being complemented is a stable operation with respect to the application of the exclusive OR function, that is to say such that:

$$\forall (x,y): f(x \oplus y) = f(x) \oplus f(y)$$

This is the case, among others, of the permutations and the transfer of data.

As mentioned above, a conventional DES consists of operations meeting the criteria defined above but the invention also applies to any algorithm carrying out a function analogous to that of a DES, provided that it consists of operations meeting the conditions given above.

Other operations of random nature can be combined with those which define the method described above. In particular, when several consecutive operations of the chain are commutative, it is possible to permute the order of their execution in a random manner.

The invention claimed is:

1. A method of executing and validating a cryptographic protocol between a server entity and a microcircuit card in order to resist a Differential Power Analysis attack against the microcircuit card during execution of said cryptographic protocol, said method comprising the steps of:

storing a first set of instructions for a first chain of operations and a key in both the server entity and the microcircuit card, said first chain of operations implementing a Data Encryption Standard algorithm, storing, at the microcircuit card, a second set of instructions for a second chain of operations based on the first chain of operations stored in said microcircuit card, said second chain of operations comprising a succession of operations each corresponding to a complement of a respective one of the operations in the first chain of operations, sending a request from said server entity to said microcircuit card for generating a message and sending said message to the server entity, executing, at the server entity, when said message from the microcircuit card is received by said server entity, said first set of instructions for the first chain of operations stored therein using said key and said message to obtain a server result, identifying, in the microcircuit card, after reception of the request from the server entity, a selected chain of operations, said step of identifying comprising randomly choosing one of the following groups as said selected chain: 1) all of the operations in said first chain of operations stored in the microcircuit card; or 2) all of the operations in said second chain of operations stored in the microcircuit card as well as an additional complementation instruction;

executing, in the microcircuit card, with said key and said message which has been sent by said microcircuit card to said server entity, instructions for the identified and selected chain of operations, outputting a result of a last operation of the identified and selected chain of operations as a resultant message, comparing the resultant message to the server result, and validating the cryptographic protocol between the server entity and the microcircuit card when the server result and the resultant message are identical.

2. The method of claim 1, wherein at least one of said operations in the first chain of operations comprises an exclusive OR.

3. The method of claim 1, wherein at least one of said operations in the first chain of operations comprises an operation of bit permutation of an intermediate result obtained from execution of an operation of said first chain of operations preceding said operation of bit permutation within said first chain of operations.

4. The method of claim 1, wherein at least one of said operations in the first chain of operations comprises an operation of indexed access to a table.

5. The method of claim 1, wherein at least one of said operations in the first chain of operations comprises an operation which is stable with respect to the application of an exclusive OR function.

6. The method of claim 1, wherein at least one of said operations in the first chain of operations comprises an operation of transfer of an intermediate result obtained from execution of an operation of said first chain of operations preceding said operation of transfer within said first chain of operations, from one location to another one in a storage space.

7. The method of claim 1, wherein the step of randomly choosing comprises generating a random parameter that is used to identify which of said groups of operations to choose.

8. The method of claim 1, further comprising the step of computing a parameter which is equal to a difference between a number of times when one of said groups has been executed during preceding cycles and a number of times when the other of said groups has been executed during said preceding cycles, and when the difference exceeds a given threshold, decreasing the difference during a current cycle.

9. The method of claim 1, wherein the step of storing, at the microcircuit card, the second set of instructions comprises storing instructions for a succession of operations each corresponding to a complement byte by byte of one of the operations in the first chain of operations.

10. The method of claim 1, wherein the step of storing, at the microcircuit card, the second set of instructions comprises storing instructions for a succession of operations each corresponding to a complement bit by bit of one of the operations in the first chain of operations.

11. The method of claim 1, wherein the step of storing the second set of instructions for the second chain of operations further comprises a step of applying a permutation of the order of successive commutative operations in the first chain of operations before storing said second set of instructions.

12. The method of claim 11, wherein the step of determining a permutation of the order of successive commutative operations is carried out randomly.

13. A method of executing and validating a cryptographic protocol between a server entity and a microcircuit card in order to resist a Differential Power Analysis attack against the microcircuit card during execution of said cryptographic protocol, said method comprising the steps of:

storing a first set of instructions for a first chain of operations and a key in both the server entity and the microcircuit card, said first chain of operations implementing a Data Encryption Standard algorithm, storing, at the microcircuit card, a second set of instructions for a second chain of operations based on the first chain of operations stored in said microcircuit card, said second chain of operations comprising a succession of operations each corresponding to a complement of a respective one of the operations in the first chain of operations, sending a message from said server entity to said microcircuit card, executing, at the server entity, when said message from the microcircuit card is received by said server entity, said first set of instructions for the first chain of operations stored therein using said key and said message to obtain a server result, identifying, in the microcircuit card upon reception by said microcircuit card of said message received from the server entity, a selected chain of operations, said step of identifying comprising randomly selecting, for each operation of the first chain of operations in said microcircuit card, either said each operation or the corresponding operation in the second chain of operations in said microcircuit card;

executing, in the microcircuit card, instructions for the identified and selected chain of operations using said key and said message, outputting a result of a last operation executed in said identified and selected chain of operations either in an uncomplemented state or a complemented state as a resultant message, depending on a number representative of successive random selections, comparing the resultant message to the server result, and validating the cryptographic protocol between the server entity and the microcircuit card when the server result and the resultant message are identical.

14. The method of claim 13, wherein the step of randomly selecting comprises generating a random parameter before randomly selecting said operations from either the first chain of operations or from the second chain of operations and updating a complementation counter, and the step of outputting the resultant message includes deciding to output the result of the last operation in the uncomplemented state or in the complemented state depending on a state of the complementation counter.

15. The method of claim 13, wherein the step of randomly selecting comprises generating a random parameter before randomly selecting said operations from either the first chain of operations or the second chain of operations and wherein said method further comprises updating, in parallel with each operation, information to be used during the step of outputting the resultant message to determine whether to output the result of the last operation in the uncomplemented state or the complemented state as the resultant message.

16. The method of claim 13, wherein the step of identifying further comprises a step of computing a parameter which is equal to a difference between a number of times when an operation of the first chain of operations is executed and a number of times when an operation of the second chain of operations is executed, and when the difference exceeds a given threshold, a next operation to be included in the selected chain of operations is selected from either the first chain of operations or the second chain of operations so as to decrease this difference.

17. The method of claim 13, wherein the step of executing in the microcircuit card further comprises a selection between using the message as the message is or using the message in complemented form.

* * * * *